United States Patent [19]

Jang

[11] Patent Number: 5,259,222
[45] Date of Patent: Nov. 9, 1993

[54] SPECIAL FUNCTION OF LOCKING SYSTEM WITH THEFT-PROTECT FOR CAR EQUIPMENTS

[76] Inventor: Jaw-Jia Jang, 6F, No. 36-5, Ho Ping Rd, Pan Chiao City, Taipei Hsien, Taiwan

[21] Appl. No.: 872,930

[22] Filed: Apr. 20, 1992

[51] Int. Cl.⁵ .............................................. B60R 25/02
[52] U.S. Cl. ........................................ 70/209; 70/238
[58] Field of Search ............... 70/209, 211, 212, 225, 70/226, 236, 237, 238

[56] References Cited

U.S. PATENT DOCUMENTS

| | | | |
|---|---|---|---|
| 1,395,970 | 11/1921 | Nidermaier | 70/226 |
| 3,190,090 | 6/1965 | Zaidener | 70/212 |
| 3,245,239 | 4/1966 | Zaidener | 70/211 |
| 3,550,409 | 12/1970 | Pariser | 70/212 |
| 3,664,164 | 5/1972 | Zaidener | 70/211 |
| 3,742,743 | 7/1973 | Stoyanovitch | 70/225 |
| 4,103,524 | 8/1978 | Mitchell et al. | 70/209 |
| 4,887,443 | 12/1989 | Wang | 70/209 |
| 4,935,047 | 6/1990 | Wu | 70/209 |
| 4,949,561 | 8/1990 | Solow et al. | 70/209 |
| 4,961,331 | 9/1990 | Winner | 70/209 |
| 4,970,884 | 11/1990 | Solow et al. | 70/209 |
| 5,014,529 | 5/1991 | Wu | 70/209 |
| 5,062,282 | 11/1991 | Rong | 70/209 |
| 5,069,048 | 12/1991 | Lo | 70/209 |
| 5,092,146 | 3/1992 | Wang | 70/209 |
| 5,099,664 | 3/1992 | Wen-Yin | 70/209 |
| 5,107,692 | 4/1992 | Chen | 70/209 |

Primary Examiner—Peter M. Cuomo
Assistant Examiner—Darnell M. Boucher

[57] ABSTRACT

A multi-function and stick-shaped var lock device, which consist of an upper double -U- device hook assembly, a lower double -U- hook assembly, a holdable tube, a block, and I-type support. The multi-function car lock can be used for locking up the steering wheel and the brake treadle of a car simultaneously; the lock can also be used for locking up the steering wheel of a car by using the upper double -U- hook assembly and a single U shaped hook on the holdable tube; therefore, the lock can be used for locking up more than one points of a car to prevent a car from being picked or towed away, and it is deemed a practical and simplestick car lock.

2 Claims, 5 Drawing Sheets

SPECIAL FUNCTION OF LOCKING SYSTEM WITH THEFT-PROTECT FOR CAR EQUIPMENTS

BACKGROUND OF THE INVENTION

Most of the conventional car locks each can only provide a single function, i.e., to lock up one part of a car, and therefore it is unable to provide a complete security to a car in terms of preventing the same from being picked and stolen.

The subjected invention relates to a multi-function and stick-shaped locking system to prevent a vehicle from being stolen. The car according to the present invention comprises two double-U hook assemblies on both ends of the extension tube of the lock respectively. The back-to-back double-U hooks can hold the steering wheel and the treadle of the brake or the clutch of a care to provide a traditional function of a stick-lock. However, the vertical back-to-back hooks hook both the steering wheel and the brake treadle which is stepped extremely. The above two methods each can be selected for use as the case may be. Especially, when the latter method is used to lock a car, the steering wheel and the brake treadle are stepped extremely and no one can tow the vehicle away.

SUMMARY OF THE INVENTION

The multi-function car lock comprises mainly a tube with an extension multi-joint rod mounted therein. The two double-U hooks are in same shape at each end of the lock device. The two double-U hooks can be used to lock the steering wheel and the brake treadle or clutch seperately, or to maintain a distance between the steering wheel and the brake treadle by fixing the multi-joint rod till the steering wheel and the brake treader or clutch being controlled completely. Then the wheels of vehicle are further braked entirely. Thus, the car burglar will be unable to steal the car by all means, including to start or to tow away a car.

DETAILED DESCRIPTION OF THE PREFERRED EMBODIMENT

Figure 1:
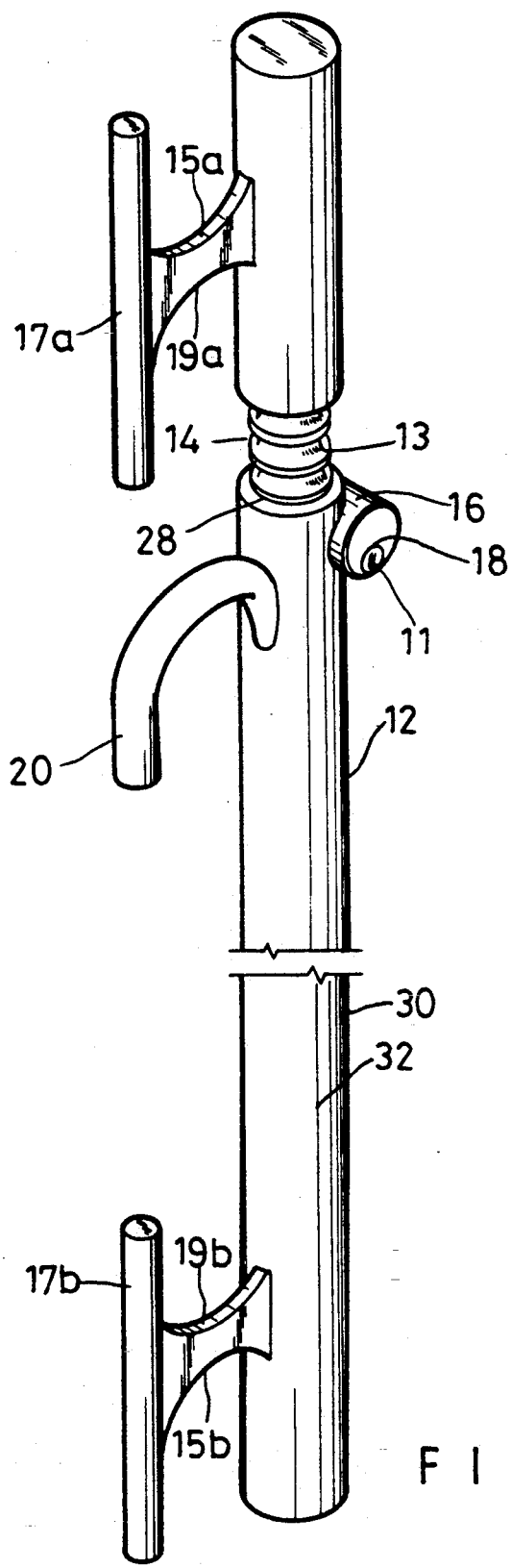
FIG. 1 is a perspective view of an embodiment according to the present invention.

Referring to FIG. 1, it illustrates a perspective view of an embodiment according to the present invention, in which a holdtube 12 is used to facilitate holding the lock by a user. A multi-joint rod 30 according to the present invention has a plurality of round joints 14. The surface of joints (14) is furnished with a plurality of round grooves (13) to enable the joints (14) to adjust the length between the multi-joint rod 30 and the holdable tube 12. The multi-joint rod 30 can be released to move back and forth by unlocking a lock 16 with a key through a hole (18) of the lock which is on the top of the holdable tube 12. The features of the present invention are the double-U hooks (15a) and (15b) which are located at each end of the holdable tube 12. The double-U hooks (15a) and (15b) are in same shape with two U-shaped hooks each. The pulling hooks (17a) and (17b) are in U-shape and the openings thereof are facing each other, which are same as the traditional stick-lock with a single hook to be applied to both the steering wheel (22) and the treadle of the brake (24). Furthermore, the other U-shaped openings of the hooks are opposite to each other. The openings of the topping hooks (19a) and (19b) are opposite to each other. The lock device can have the wheels of a car braked surely without being towed away by locking the steering wheel (22) and the brake treadle (24) with the U-shaped opening of the topping hooks (19a) and (19b). The double-U hooks (15a) and (15b) are welded firmly to the upper part of the round joints 14. One of the hooks (15b) is a rotary member so as to lock the brake treadle 24 at different angles.

Figure 2:
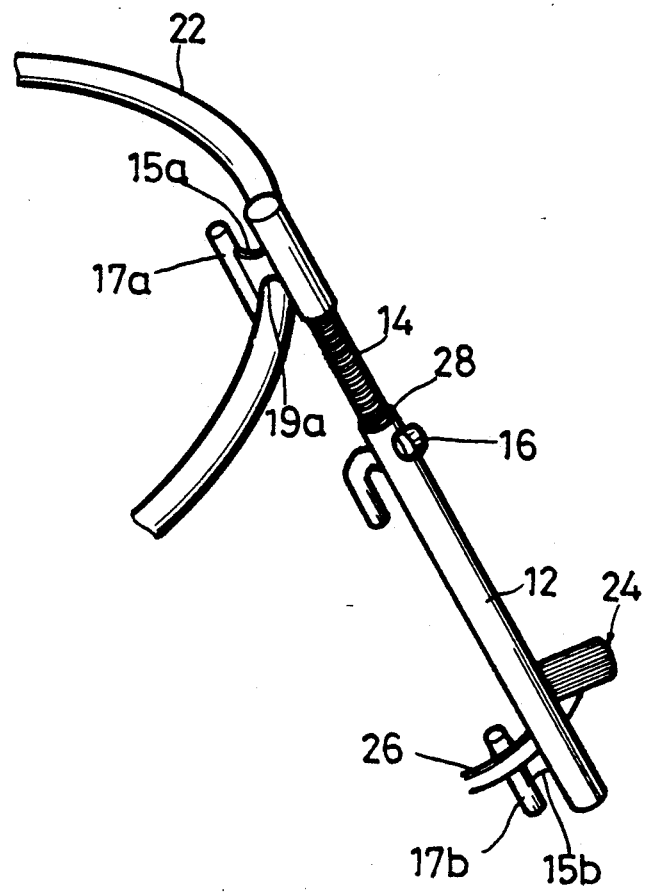
FIG. 2 is a perspective view of the present invention, being used to lock up a steering wheel and a brake treadle of a car by hooking them together.

FIG. 2 illustrates the embodiment of the present invention, in which the multi-functional stick-shaped lock device is used in a way same as a traditional locking method of stick-shaped lock. However, the double-U hooks (15a) and (15b) are different from the traditional lock with a single hook. Thus, FIG. 2 illustrates the locking steps as follows: First of all, the key (11) must be inserted to the hole (18) on the lock to start working and enable the multi-joint rod 30 in the tube (12) to be released to have the multi-joint rod 30 adjusted in a length desired adjusted; the round grooves 13 are furnished on the multi-joint rod 30 to enable the holdable tube 12 to make adjustment. In addition, the pulling hooks (17a) and (17b) of the double-U hooks (15a) and (15b) can be used to hook onto the extending pole (26) of a brake treadle (24) and onto the steering wheel (22) respectively. (The double-U hook (15b) can be rotated at a angle to adapt to the movement of the brake treadle (24).) The length between the round joints 14 and the holdable tube 12 should be adjusted to a tight condition between the two pulling hooks (17a) and (17b). Then, the key can be turned to the original position and pulled out to finish the complete locking operation. Since the present invention is manufactured with a special steel it would be unable to be cut off by anyone with any tool except with the key (11). The operation of the steering wheel (22) and the brake treadle (24) are therefore locked up and limited so as to prevent a car from being stolen or towed away.

Figure 3:
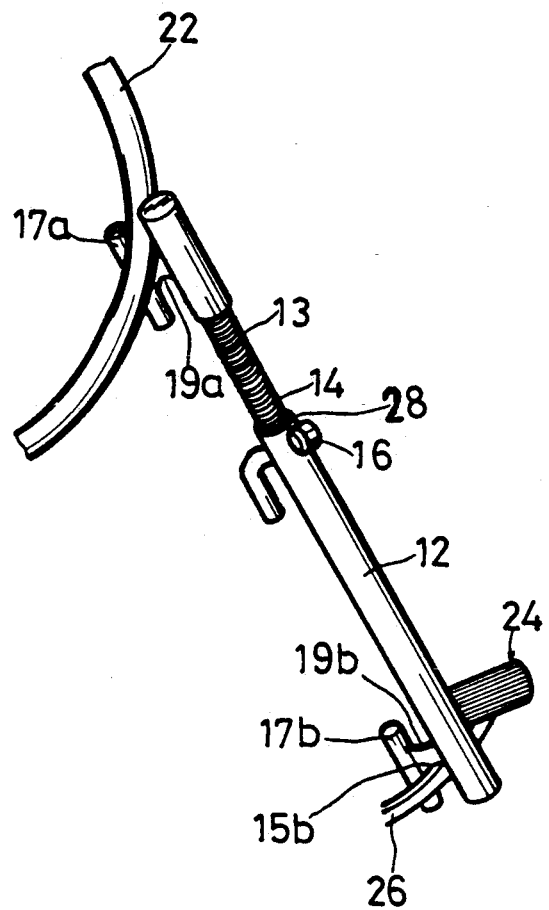
FIG. 3 is a perspective view of the present invention, being used to lock up a steering wheel and a brake treadle of a car by pushing them tightly.

Refering to FIG. 3 furthermore, it illustrates the multi-function and stick-shaped car lock device being used to lock up a car by pushing the steering wheel and the brake treadle in opposite directions: the key (11) is firstly inserted into the hole 18 to unlock the lock 16 so as to set the holdable tube 12 in a freely adjustable condition and to adjust the same in a length desired; then, two top hooks 19a and 19b located at both ends of the lock device are locked to the steering wheel 22 and the brake treadle 24 which is stepped down completely. Meanwhile, the distance between the steering wheel (22) and the brake treadle (24) is set at a possible long distance. At last, the key can be turned to the original position and pulled out to finish the locking steps. As the brake treadle has been stepped down completely, the wheels of a car are lock up, and the car will not be towed freely. To remove the lock device, a user may simply unlock the lock to release the hooks from the steering wheel and the brake treadle; the car will be set in a free condition.

Figure 4:
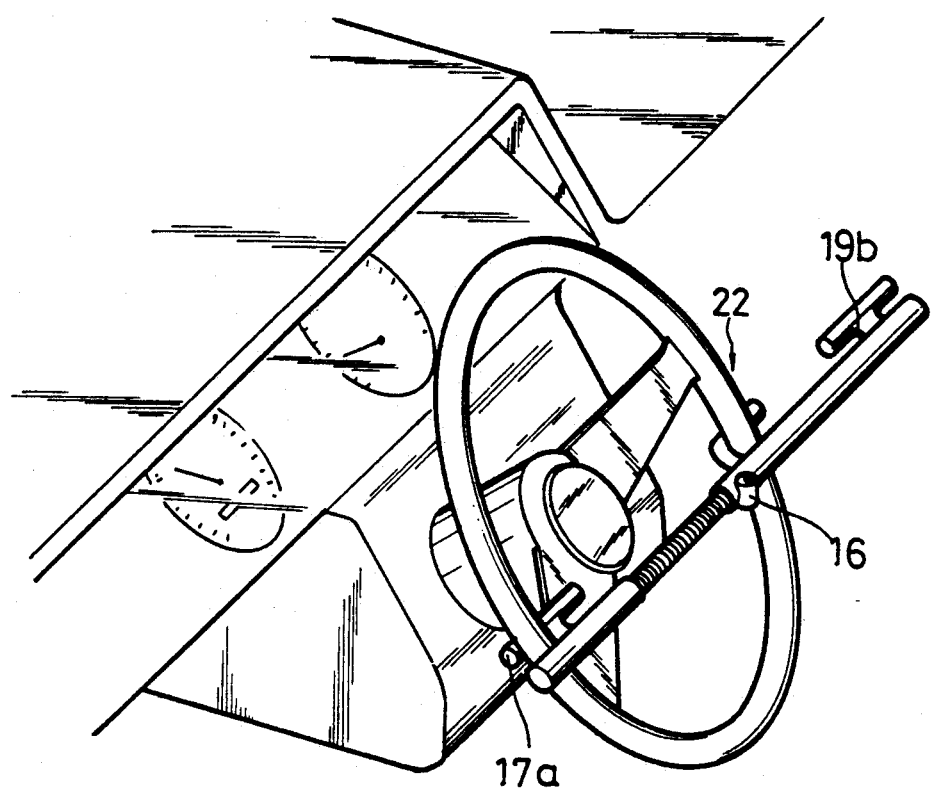
FIG. 4 is a perspective view of the present invention, being used to lock up a steering wheel of a car.
Figure 5:
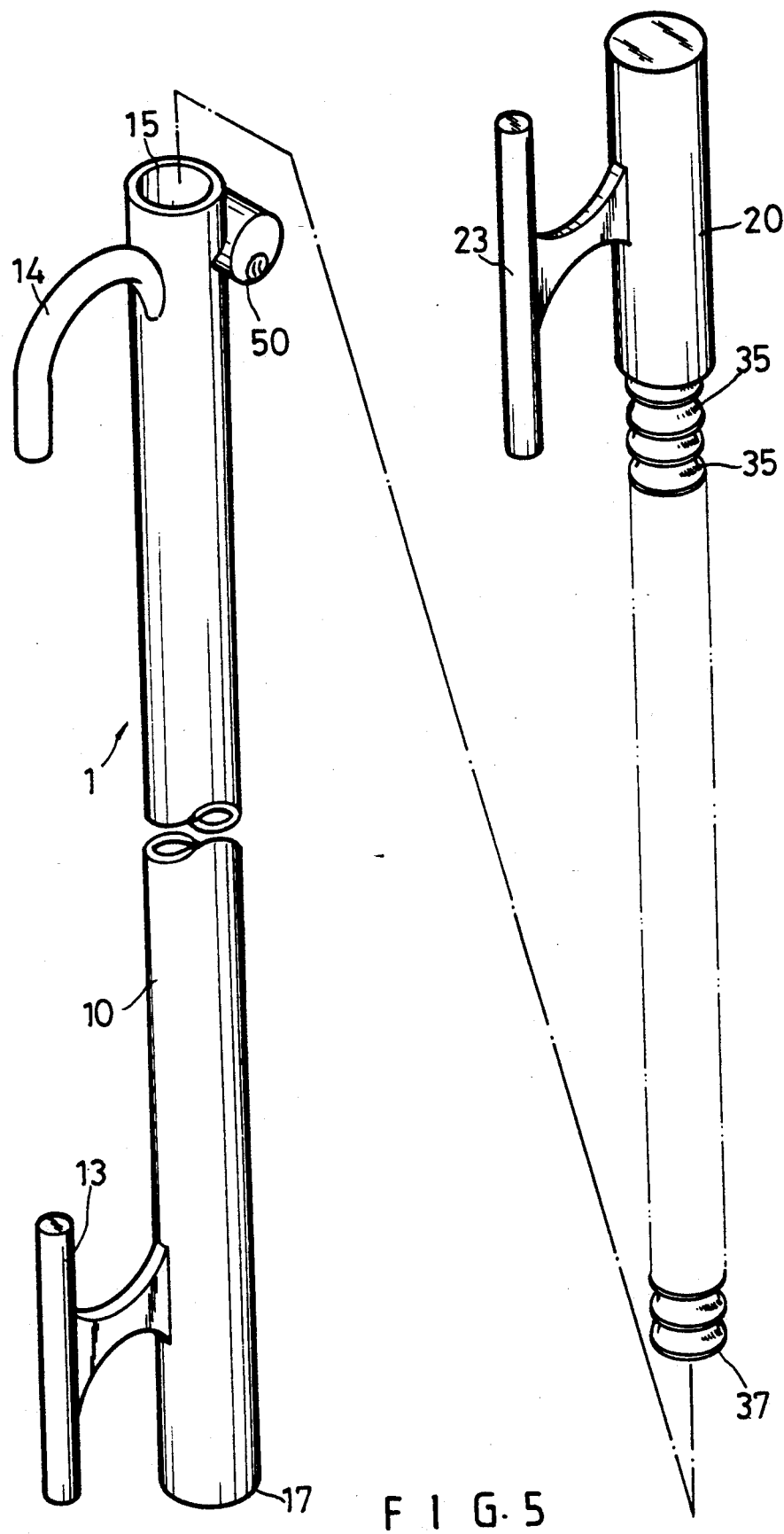
FIG. 5 is a disassembled view of the present invention, showing a multi-joint rod of the upper double-U hook thereof.

FIG. 4 illustrates the multi-function and stick-shaped lock device according to the present invention, being used to lock up the steering wheel of a car only; in that case, the steering wheel will not be turned, or the car window or the car door will be damaged, and therefore the car burglar will be unable to steal the car.

Any minor modification or change on the present invention made by a person who is skilled in the art will be deemed within the scope claimed in the claims attached.

I claim:

1. A multi-function and stick-shaped car lock device comprising: an upper double -U hook assembly which including an upper pulling hook, a top hook and a multi-joint rod;

A lower double -U hook assembly which including a lower pulling hook, a top hook, a holdable tube with a lock and a single U-shaped hook on the upper part thereof; said single U-shaped hook and said lower double -U hook being aligned with each other, while said lock being attached on the opposite said of said single U-shaped hook; a given length, between said upper double -U hook assembly and said lower double -U hook assembly able to be set by adjusting said multi-joint rod movably mounted in said holdable tube through operation of said lock on said holdable tube.

2. A multi-function and stick shaped car lock device as claimed in claim 1, wherein said holdable tube can be rotated so as to facilitate said lock device to lock up a brake treadle of a car upon being moved at a given angle; said lock device able to lock up a steering wheel and a brake treadle of a car simultaneously to prevent a car from being stolen and towed away; because of the wheels of said car being braked completely; said lock device able to lock a steering wheel only to prevent said steering wheel from turning and therefore to preventing a car from being driven away.

* * * * *